(12) United States Patent
Ohashi et al.

(10) Patent No.: US 8,740,197 B2
(45) Date of Patent: Jun. 3, 2014

(54) VIBRATION-DAMPING DEVICE

(75) Inventors: Masaaki Ohashi, Kawasaki (JP);
Katsumi Someya, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 358 days.

(21) Appl. No.: 12/864,648

(22) PCT Filed: Jan. 27, 2009

(86) PCT No.: PCT/JP2009/051249
§ 371 (c)(1),
(2), (4) Date: Nov. 8, 2010

(87) PCT Pub. No.: WO2009/096378
PCT Pub. Date: Aug. 6, 2009

(65) Prior Publication Data
US 2011/0042871 A1    Feb. 24, 2011

(30) Foreign Application Priority Data
Jan. 28, 2008  (JP) ................. 2008-016358

(51) Int. Cl.
*F16F 5/00* (2006.01)

(52) U.S. Cl.
USPC .................................................. 267/140.13

(58) Field of Classification Search
USPC ............... 267/140.11, 140.13, 140.4, 140.14, 267/140.15
See application file for complete search history.

(56) References Cited

U.S. PATENT DOCUMENTS

| 5,183,243 | A |   | 2/1993  | Matsumoto   |            |
|-----------|---|---|---------|-------------|------------|
| 5,240,233 | A | * | 8/1993  | Kato et al. | 267/140.13 |
| 5,273,262 | A | * | 12/1993 | Baldini et al. | 267/140.13 |
| 5,431,377 | A | * | 7/1995  | Klein | 267/140.13 |
| 5,571,263 | A | * | 11/1996 | Koester et al. | 267/140.13 |
| 5,971,376 | A | * | 10/1999 | Mori et al. | 267/140.13 |
| 6,036,183 | A | * | 3/2000  | Lee et al. | 267/140.14 |
| 6,311,963 | B1 | * | 11/2001 | Suzuki et al. | 267/140.13 |
| 6,357,731 | B1 | * | 3/2002  | Tanahashi | 267/140.4 |
| 6,457,703 | B1 | * | 10/2002 | Yamamoto et al. | 267/140.11 |
| 6,485,005 | B1 | * | 11/2002 | Tewani et al. | 267/140.13 |
| 6,499,729 | B1 | * | 12/2002 | Walterbusch | 267/140.13 |
| 6,547,226 | B2 | * | 4/2003  | Shores et al. | 267/140.11 |

(Continued)

FOREIGN PATENT DOCUMENTS

| JP | 4-046233 A | 2/1992 |
| JP | 5-010375 A | 1/1993 |

(Continued)

OTHER PUBLICATIONS

International Search Report for PCT/JP2009/051249 dated Apr. 7, 2009.

*Primary Examiner* — Thomas Irvin
(74) *Attorney, Agent, or Firm* — Sughrue Mion, PLLC

(57) ABSTRACT

An outer tube (11) of a vibration-damping device (10) is split into a first outer tube member (21) at a first end along the direction of an axis (O), and a second outer tube member (22) at a second end. The second end of the first outer tube member (21) in the direction of the axis (O), and the first end of the second outer tube member (22) in the direction of the axis (O) overlap each other in a radial direction of the outer tube (11) with the second rubber elastic body therebetween (23). Through this configuration, the generation of a noise from the vibration-damping device can be suppressed.

5 Claims, 2 Drawing Sheets

(56) References Cited

U.S. PATENT DOCUMENTS

| | | | |
|---|---|---|---|
| 6,655,667 B1* | 12/2003 | Hamaekers et al. | 267/140.13 |
| 6,663,090 B2* | 12/2003 | Simuttis et al. | 267/140.13 |
| 7,044,455 B2* | 5/2006 | Yoshida et al. | 267/140.13 |
| 7,097,168 B2* | 8/2006 | Ichikawa et al. | 267/140.13 |
| 7,588,235 B2* | 9/2009 | Happou et al. | 267/140.13 |
| 7,802,777 B2* | 9/2010 | Katayama et al. | 267/140.13 |
| 2003/0075848 A1* | 4/2003 | Okanaka et al. | 267/140.13 |
| 2003/0141640 A1* | 7/2003 | Kato | 267/140.11 |
| 2007/0075470 A1 | 4/2007 | Happou et al. | |
| 2010/0187733 A1* | 7/2010 | Oohashi | 267/140.13 |

FOREIGN PATENT DOCUMENTS

| | | |
|---|---|---|
| JP | 5-044770 A | 2/1993 |
| JP | 8-291835 A | 11/1996 |
| JP | 2003-222182 A | 8/2003 |
| JP | 2006-220230 A | 8/2006 |
| JP | 2007-100875 A | 4/2007 |

* cited by examiner

VIBRATION-DAMPING DEVICE

TECHNICAL FIELD

The present invention relates to a vibration-damping device which is applied to, for example an automobile, or an industrial machine, and absorbs and attenuates vibration of vibration generating portions, such as an engine. The present application claims priority on Japanese Patent Application No. 2008-16358, filed Jan. 28, 2008, the content of which is incorporated herein by reference.

BACKGROUND ART

As this type of vibration-damping device, for example, a device shown in the following Patent Document 1 is known. This device includes an outer tube which is connected to one of a vibration generating portion and a vibration receiving portion, an attaching member which is connected to the other of the vibration generating portion and the vibration receiving portion, and is arranged on the inner circumferential side of the outer tube, a first rubber elastic body which elastically connects the outer tube and the attaching member together, and closes an opening at a first end of the outer tube in the direction of an axis, a diaphragm which closes an opening at a second end in which the other end of the outer tube in the direction of the axis, and a partition member which elastic body at a portion of a partition wall, and an auxiliary fluid chamber having the diaphragm at a portion of the partition wall. Additionally, an orifice passage which allows the main fluid chamber and the auxiliary fluid chamber to communicate with each other is formed between the outer circumferential surface of the partition member and the inner circumferential surface of the outer tube.
[Patent Document 1] JP-A-8-291835

DISCLOSURE OF INVENTION

Technical Problem

However, in the conventional vibration-damping device, due to fluctuation of the liquid pressure within the main fluid chamber or the auxiliary fluid chamber, or the vibration propagated from the vibration generating portion, a noise may be generated as the partition member disposed inside the outer tube is jounced, and the vibration propagates to the outer tube.

Moreover, a shock wave may be generated when bubbles, which are generated when the main fluid chamber has negative pressure and cavitation occurs, have disappeared with a rise in liquid pressure within the main fluid chamber. And then a noise may be generated as this shock wave propagates to, for example, the partition member, or the outer tube.

The invention was made in consideration of such a situation, and the object thereof is to provide a vibration-damping device capable of suppressing the generation of a noise.

Technical Solution

The vibration-damping device of the invention has the following configurations in order to solve the above problems and achieve such an object. That is, this vibration-damping device includes an outer tube which is connected to one of a vibration generating portion and a vibration receiving portion, an attaching member which is connected to the other of the vibration generating portion and the vibration receiving portion, and is arranged on the inner circumferential side of the outer tube, a first rubber elastic body which elastically connects the outer tube and the attaching member together, and closes an opening at a first end of the outer tube in the direction of an axis, a diaphragm which closes an opening at a second end in which the other end of the outer tube in the direction of the axis, and a partition member which partitions the inside of the outer tube into a main fluid chamber having the first rubber elastic body at a portion of a partition wall, and an auxiliary fluid chamber having the diaphragm at a portion of the partition wall. Additionally, an orifice passage which allows the main fluid chamber and the auxiliary fluid chamber to communicate with each other is formed between the outer circumferential surface of the partition member and the inner circumferential surface of the outer tube. Moreover, the outer tube is split into a first outer tube member at the first end side and a second outer tube member at the second end side, along the direction of axis, and the second end of the first outer tube member in the direction of the axis, and the first end of the second outer tube member in the direction of the axis overlap each other in the radial direction of the outer tube with a second rubber elastic body therebetween.

Since this invention has the above configuration, even if vibration propagates to caused to jounce due to fluctuation of the liquid pressure within the main fluid chamber or the auxiliary fluid chamber or the vibration propagated from the vibration generating portion or the like, or a shock wave is generated due to the occurrence of cavitation in the main fluid chamber, this vibration can be absorbed by the second rubber elastic body, and generation of a noise can be suppressed.

Additionally, since the second end of the first outer tube member and the first end of the second outer tube member overlap each other in the radial direction with the second rubber elastic body therebetween, even if the thickness of the second rubber elastic body is enlarged compared to a case, for example, where the second end edge of the first outer tube member and the first end edge of the second outer tube member are butted against each other in the direction of the axis with the second rubber elastic body therebetween, it is possible to suppress deterioration of damping performance. Accordingly, the durability of the second rubber elastic body and the aforementioned suppressing effect of generation of a noise can be easily secured by increasing the thickness of the second rubber elastic body.

Here, the attaching member and the first rubber elastic body may be disposed at the first outer tube member; the diaphragm, the partition member, and the orifice passage may be disposed at the second outer tube member, and the second rubber elastic body may be located inside the main fluid chamber in the direction of the axis, and located radially outside the main fluid chamber.

In this case, the second rubber elastic body is located inside the main fluid chamber where cavitation occurs in the direction of the axis and radially outside the main fluid chamber. Thus, when a shock wave generated in the main fluid chamber has rubber elastic body so as to absorb the shock wave, without propagating the shock wave throughout the outer tube.

Additionally, since the outer tube is split in the direction of the axis so that the second rubber elastic body is located inside the main fluid chamber in the direction of the axis, it is possible to easily vary the internal volume of the main fluid chamber so as to correspond to the load which has acted on the vibration-damping device, thereby suppressing the fluctuation of liquid pressure, and occurrence of cavitation can be suppressed.

Additionally, in this configuration, the second end of the first outer tube member may be located radially outside the first end of the second outer tube member.

In this case, it is possible to easily press-fit the first outer tube member into an attaching bracket for attaching the outer tube to the vibration generating portion or the vibration receiving portion.

Moreover, as mentioned above, since it is possible to propagate the shock wave propagated to the outer tube directly to the second rubber elastic body so as to absorb the shock wave, without propagating the shock wave throughout the outer tube, the shock wave propagated to the outer tube can be reliably kept from being transmitted to the attaching bracket, and the generation of a noise can be more reliably suppressed.

In addition, when the second outer tube member in which the diaphragm, the partition member, and the orifice passage are disposed is intended to be press-fitted into the attaching bracket, damping performance may be degraded due to deviation of the arrangement position of the diaphragm or the like in the second outer tube member, the radial outside, of which at least a radial outer end is located radially outside the outer circumferential surface of the second outer tube member, may be formed at the second end of the first outer tube member.

In this case, since the push-in surface portion is formed at the second end of the first outer tube member, when the first outer tube member is press-fitted into the attaching bracket from the first end thereof, it is possible to push the push-in surface portion toward the inside of the attaching bracket from the second end thereof in the direction of the axis, and the vibration-damping device can be more easily attached to the attaching bracket.

Additionally, in this configuration, a throttled portion may be formed at the second end of the first outer tube member, a portion connected to the throttled portion at the first end in the direction of the axis may serve as the push-in surface portion, and a portion at the first end of the second outer tube member located closer to the first end in the direction of the axis than the throttled portion may be formed with a projecting portion which is increased in diameter, and faces the push-in surface portion in the direction of the axis with the second rubber elastic body therebetween.

In this case, the throttled portion and the projecting portion are formed as described above. Therefore, when a load is applied to the vibration-damping device, the first outer tube member and the second outer tube member are separated from each other along the direction of the axis, and the push-in surface portion and the projecting portion approach each other while the portion (hereinafter referred to as a shear portion) of the second rubber elastic body located between the portion of the outer circumferential surface at first end of the second outer tube member connected to the projecting portion tube member is shear-deformed along the direction of the axis. In the process, the portion of the second rubber elastic body interposed between the push-in surface portion and the projecting portion is compressively deformed, and the hardness thereof increases. As a result, movement of the first outer tube member and the second outer tube member is regulated.

Accordingly, it is possible to suppress shear deformation generated in the shear portion of the second rubber elastic body, and it is possible to increase the thickness of the second rubber elastic body, thereby preventing deterioration of durability or deterioration of damping performance at the time of idle vibration or shake vibration.

Moreover, in this configuration, the external diameter at the second end of the second outer tube member may be made less than or equal to the internal diameter of the throttled portion.

In this case, the external diameter at the second end of the second outer tube member is made less than or equal to the internal diameter of the throttled portion. Thus, when the first outer tube member and the second outer tube member are set within a die in the process of producing this vibration-damping device, it is possible to insert the second outer tube member into the opening at the first end in the first outer tube member from the second end of second outer tube member, thereby easily inserting the first outer tube member and the second outer tube member to predetermined positions without interference therebetween, and an increase in the manufacturing cost of this vibration-damping device can be suppressed.

Additionally, the inner circumferential surface of the outer tube may be covered second rubber elastic body may be integrally formed from the same rubber material, and the thickness of the second rubber elastic body may be made greater than the thickness of the rubber membrane.

In this case, since the rubber membrane, the first rubber elastic body, and the second rubber elastic body are integrally formed from the same rubber material, it is possible to reliably suppress an increase in the manufacturing cost of the vibration-damping device. Additionally, since the thickness of the second rubber elastic body is greater than the thickness of the rubber membrane, the durability of the second rubber elastic body and the aforementioned suppressing effect of generation of a noise are reliably secured.

Advantageous Effects

According to the invention, the generation of a noise from the vibration-damping device can be suppressed.

Figure 1:
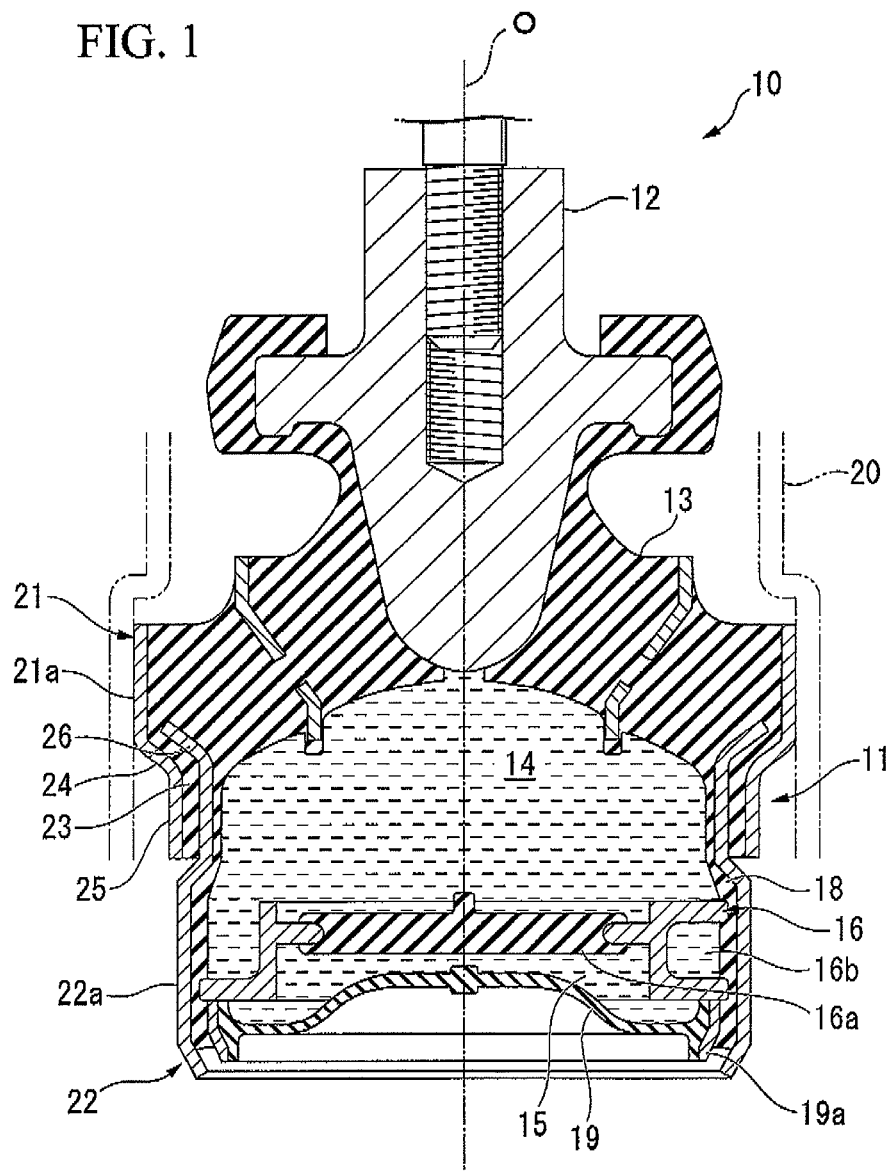
FIG. 1 is a longitudinal sectional view of a vibration-damping device shown as one embodiment related to the invention.

EXPLANATION OF REFERENCE 10, 30: VIBRATION-DAMPING DEVICE
11, 37: OUTER TUBE
12: ATTACHING MEMBER
13: FIRST RUBBER ELASTIC BODY
14: MAIN FLUID CHAMBER
15: AUXILIARY FLUID CHAMBER
18: RUBBER MEMBRANE
16, 31: PARTITION MEMBER
19: DIAPHRAGM
21, 38: FIRST OUTER TUBE MEMBER
22 39: SECOND OUTER TUBE MEMBER
23, 41: SECOND RUBBER ELASTIC BODY
25: THROTTLED PORTION
24, 40: PUSH-IN SURFACE PORTION
26: PROJECTING PORTION
O: AXIS

BEST MODE FOR CARRYING OUT THE INVENTION

Hereinafter, one embodiment of a vibration-damping device related to the invention will be described, referring to FIG. 1.

The vibration-damping device 10 includes an outer tube 11 which is connected to one of a vibration generating portion and a vibration receiving portion, an attaching member 12 which is connected to the other of the vibration generating portion and the tube 11, a first rubber elastic body 13 which elastically connects the outer tube 11 and the attaching member 12 together, and closes an opening at a first end of the outer tube 11 in the direction of an axis, a diaphragm 19 which closes an opening at a second end in which the other end of the outer tube 11 in the direction of the axis, and a partition member 16 which partitions the inside of the outer tube 11 into a main fluid chamber 14 and an auxiliary fluid chamber 15 which will be described later.

In addition, these members are formed circularly or annularly in top view, and are arranged coaxially with a common shaft. Hereinafter, this common shaft is referred to as an axis O.

In a case where the vibration-damping device 10 is mounted on, for example, an automobile, the attaching member 12 is connected to an engine as the vibration generating portion, and the outer tube 11 is connected to a vehicle body as the vibration receiving portion via an attaching bracket 20 so that vibration of the engine is kept from being transmitted to the vehicle body. Additionally, in the illustrated example, the vibration-damping device 10 is a compression type vibration-damping device which is attached and used so that the main fluid chamber 14 is located on the upper side in a vertical direction (at first end in the direction of the axis O) and the auxiliary fluid chamber 15 may be located on the lower side in the vertical direction (at second end in the direction of the axis O).

The attaching member 12 is formed in a columnar shape, and is arranged at the opening of the first end of the outer tube 11 in the direction of the axis O, and the first rubber elastic body 13 is bonded to the opening of the first end of the outer tube 11 and from the first end thereof in the direction of the axis O. In addition, a female thread portion is formed in a first end surface of the attaching member 12. Additionally, a first end in the axial direction of the attaching member 12 protrudes further outward in the direction of the axis O than the surface of the opening of the first end of the outer tube 11 in the direction of the axis O.

Moreover, a diaphragm 19 disposed at the opening of the second end of the outer tube 11 in the direction of the axis O is formed circularly in top view. Additionally, the inner circumferential surface of a ring plate 19a is vulcanized and bonded to the outer circumferential edge of the diaphragm 19 over its whole circumference. As the ring plate 19a is fitted into the opening of the second end of the outer tube 11, the diaphragm 19 closes the outer tube 11 from the second end in the direction of the axis O.

In the above configuration, the portion of the inside of the outer tube 11 located between the diaphragm 19 and the first rubber elastic body 13 is fluid-tightly sealed by the diaphragm 19 and the first rubber elastic body 13 so as to form a liquid chamber filled with a liquid. This liquid chamber is partitioned by the partition member 16 into a main fluid chamber 14 which has the first rubber elastic body 13 at a portion of a partition wall, and the internal volume of which varies due to deformation of the first rubber elastic body 13, and an auxiliary fluid chamber 15 which has the diaphragm 19 at a portion of the partition wall and the internal volume of which varies due to deformation of the diaphragm 19. In addition, the liquid includes, for example, ethylene glycol, water, silicone oil or the like.

Here, an orifice passage 16b which extends along the circumferential direction of the outer tube 11 is formed between the outer circumferential surface of the partition member 16 and the inner circumferential surface of the outer tube 11.

In the illustrated example, the partition member 16 is formed annularly, a circumferential groove formed in the outer circumferential surface of the partition member serves as an orifice passage 16b, and this orifice passage 16b is closed by a rubber membrane 18 covered on the inner circumferential surface of the outer tube 11 from the radial outside. In addition, the rubber membrane 18 is formed integrally with the first rubber elastic body 13, and the inner circumferential surface of the outer tube 11 is wholly covered with the first rubber elastic body 13 and the rubber membrane 18. Additionally, a disk-shaped rubber member 16a is disposed radially inside the partition member 16 to close a radial central portion of the partition member 16 which is formed annularly.

In this embodiment, the outer tube 11 is split into a first outer tube member 21 at first end and a second outer tube member 22 at the second end along the direction of the axis O, and the second end of the first outer tube member 21 in the direction of the axis O and the first end of the second outer tube member 22 in the direction of the axis O overlap each other in the radial direction of the outer tube 11 with the second rubber elastic body 23 therebetween.

Additionally, the attaching member 12 and the first rubber elastic body 13 are disposed at the first outer tube member 21, and the diaphragm 19, the partition member 16, and the orifice passage 16b are disposed at the second outer tube member 22. Moreover, the second end of the first outer tube member 21 is located radially outside the tube member 22 enters the second end of the first outer tube member 21.

Additionally, the second rubber elastic body 23 is located inside the main fluid chamber 14 in the direction of the axis O and radially outside the main fluid chamber 14. That is, the second rubber elastic body 23 surrounds a portion of the main fluid chamber 14 in the direction of the axis O over its whole circumference from the radial outside. Additionally, in this embodiment, the aforementioned rubber membrane 18, the first rubber elastic body 13, and the second rubber elastic body 23 are integrally formed from the same rubber material. Additionally, the size, i.e., thickness of the second rubber elastic body 23 in a direction in which the inner circumferential surface of the second rubber elastic body at the second end of the first outer tube member 21 and the outer circumferential surface of the second rubber elastic body at the first end of the second outer tube member 22 face each other, is made greater than the thickness of the rubber membrane 18.

Additionally, a push-in surface portion 24 which extends toward the radial outside, of which at least a radial outer end is located radially outside the outer circumferential surface of the second outer tube member 22, is formed at the second end of the first outer tube member 21. In the illustrated example, a throttled portion 25 is formed at the second end of the first outer tube member 21, and a portion connected to the throttled portion 25 at the first end in the direction of the axis O becomes the push-in surface portion 24. In addition, the throttled portion 25 is formed at the second end of the first outer tube member 21. member 22 reaches the push-in surface portion 24 beyond the throttled portion 25 along the direction of the axis O from the opening at the second end within the first outer tube member 21. Moreover, a portion at the first end of the second outer tube member 22 located closer to the first end in the direction of the axis O than the throttled portion 25 is formed with a projecting portion 26 which is increased in diameter, and is located radially outside the inner circumferential surface of the throttled portion 25. Thereby, the inner surface of the push-in surface portion 24 in the first outer tube member 21 and the projecting portion 26 in the second outer tube member 22 face each other in the direction of the axis O with the second rubber elastic body 23 therebetween. In addition, the second rubber elastic body 23 is compressively deformed in its thickness direction.

Additionally, the push-in surface portion 24 and the projecting portion 26 are gradually increased in diameter toward the first end from the second end in the direction of the axis O. Additionally, the projecting portion 26 is formed at the first end of the second outer tube member 22 in the direction of the axis O. Additionally, the tip of the projecting portion 26 is located radially inside the inner circumferential surface of the first outer tube member 21. Additionally, the portion of the first outer tube member 21 located closer to the first end in the direction of the axis O than the push-in surface portion 24 serves as a press-fit tubular portion 21a which extends along the direction of the axis O parallel thereto, and the press-fit tubular portion 21a is press-fitted into an attaching bracket 20. That is, the press-fit tubular portion 21a of the first outer tube member 21 is press-fitted into the attaching bracket 20 by pushing in the push-in surface portion 24 toward the inside of the bracket 20 from the second end thereof in the direction of the axis O. In addition, the internal diameter and external diameter of the Moreover, in this embodiment, the internal diameter of the throttled portion 25 in the first outer tube member 21 is made smaller than the external diameter of a second end portion 22a of the second outer tube member 22 located outside in the direction of the axis O from the opening at the second end of the first outer tube member 21. That is, the second end edge of the first outer tube member 21 in the direction of the axis O faces a first end edge in the direction of the axis O of the second end portion 22a of the second outer tube member 22 in the direction of the axis O. In addition, the push-in surface portion 24 is located radially outside the second end portion 22a of the second outer tube member 22.

As described above, according to the vibration-damping device 10 of this embodiment, the outer tube 11 is split into the first outer tube member 21 and the second outer tube member 22 along the direction of the axis O, and the second end of the first outer tube member 21 and the first end of the second outer tube member 22 overlap each other in the radial direction with the second rubber elastic body 23 therebetween. Thus, even if vibration propagates to the outer tube 11 such that the partition member 16, the ring plate 19a, or the like disposed inside the outer tube 11 are caused to jounce due to fluctuation of the liquid pressure within the main fluid chamber 14 or the auxiliary fluid chamber 15, the vibration propagated from the vibration generating portion, or the like, or a shock wave is generated due to the occurrence of cavitation in the main fluid chamber 14, this vibration can be absorbed by the second rubber elastic body 23, and the generation of a noise can be suppressed.

Additionally, since the second end of the first outer tube member 21 and the first the second rubber elastic body 23 therebetween, for example, even if the thickness of the second rubber elastic body 23 is enlarged compared to a case where the second end edge of the first outer tube member 21 and the first end edge of the second outer tube member 22 are abutted each other in the direction of the axis O with the second rubber elastic body 23 therebetween, it is possible to suppress deterioration of damping performance. Accordingly, the durability of the second rubber elastic body and the aforementioned suppressing effect of generation of a noise can be easily secured by increasing the thickness of the second rubber elastic body 23.

Additionally, in this embodiment, the second rubber elastic body 23 is located inside the main fluid chamber 14 where cavitation occurs in the direction of the axis O and radially outside the main fluid chamber. Thus, when a shock wave generated in the main fluid chamber 14 has propagated to the outer tube 11, it is possible to propagate this shock wave directly to the second rubber elastic body 23 so as to absorb the shock wave, without propagating the shock wave throughout the outer tube 11.

Additionally, since the outer tube 11 is split in the direction of the axis O so that the second rubber elastic body 23 is located inside the main fluid chamber 14 in the direction of the axis O, it is possible to easily vary the internal volume of the main fluid chamber 14 so as to correspond to the load which has acted on the vibration-damping device 10, thereby suppressing the fluctuation of liquid pressure, and the occurrence of cavitation can be suppressed.

Moreover, since the second end of the first outer tube member 21 is located radially outside the first end of the second outer tube member 22, it is possible to easily Additionally, since it is possible to propagate the shock wave propagated to the outer tube 11 directly to the second rubber elastic body 23 so as to absorb the shock wave, without propagating the shock wave throughout the outer tube 11, the shock wave propagated to the outer tube 11 can be reliably kept from being transmitted to the attaching bracket 20, and the generation of a noise can be more reliably suppressed.

Moreover, since the push-in surface portion 24 is formed at the second end of the first outer tube member 21, when the first outer tube member 21 is press-fitted into the attaching bracket 20 from the first end thereof, it is possible to push in the push-in surface portion 24 toward the inside of the attaching bracket 20 from the second end thereof in the direction of the axis O, and the vibration-damping device 10 can be more easily attached to the attaching bracket 20.

Furthermore, since the rubber membrane 18, the first rubber elastic body 13, and the second rubber elastic body 23 are integrally formed from the same rubber material, it is possible to reliably suppress an increase in the manufacturing cost of the vibration-damping device 10. Additionally, since the thickness of the second rubber elastic body 23 is greater than the thickness of the rubber membrane 18, the durability of the second rubber elastic body 23 and the aforementioned suppressing effect of the generation of a noise are reliably secured.

Additionally, the throttled portion 25 is formed at the second end of the first outer tube member 21, the projecting portion 26 which faces the push-in surface portion 24 in the direction of the axis O with the second rubber elastic body 23 therebetween is formed at the first end of the second outer tube member 22. Therefore, when a load is second outer tube member 22 are separated from each other along the direction of the axis O, and the push-in surface portion 24 and the projecting portion 26 approach each other while the portion (hereinafter referred to as a shear portion) of the second rubber elastic body 23 located between the portion of the outer circumferential surface at first end of the second outer tube member 22 connected to the projecting portion 26 at the second end in the direction of the axis O, and the throttled portion 25 of the first outer tube member 21 is shear-deformed along the direction of the axis O. In the process, the portion of the second rubber elastic body 23 interposed between the push-in surface portion 24 and the projecting portion 26 is compressively deformed, and the hardness thereof increases. As a result, movement of the first outer tube member 21 and the second outer tube member 22 is regulated.

Moreover, in this embodiment, the second end edge of the first outer tube member 21 in the direction of the axis O faces the first end edge in the direction of the axis O of the second end portion 22a of the second outer tube member 22 in the direction of the axis O. Therefore, when a load is applied to the vibration-damping device 10, contrary to the above, the first outer tube member 21 and the second outer tube member 22 approach each other in the direction of the axis O, and the push-in surface portion 24 and the projecting portion 26 are separated from each other. In the process, the second end edge of the first outer tube member 21 along the direction of the axis O, and the first end edge of the second end portion 22a of the second outer tube member 22 in the direction of the axis O collide with each other. Thereby a movement of the first outer tube member 21 and the second outer tube member 22 is regulated.

From the foregoing, it is possible to reliably suppress the shear deformation occurring at the shear portion of the second rubber elastic body 23. As a result, it is preventing deterioration of durability or deterioration of damping performance at the time of idle vibration or shake vibration.

In addition, it should be understood that the technical scope of the invention is not limited to the above embodiment, but various modifications may be made without departing from the spirit and scope of the invention.

For example, in the above embodiment, the internal diameter of the throttled portion 25 in the first outer tube member 21 is made smaller than the external diameter of the second end portion 22a in the second outer tube member 22. Instead of this, however, the external diameter of the second end portion 22a in the second outer tube member 22 may be made less than or equal to the internal diameter of the throttled portion 25 of the first outer tube member 21.

In this case, when the first outer tube member 21 and the second outer tube member 22 are set within a die in the process of producing a vibration-damping device, it is possible to insert the second outer tube member 22 into the opening at the first end in the first outer tube member 21 from the second end of the second outer tube member, thereby easily inserting the first outer tube member 21 and the second outer tube member 22 to predetermined positions without interference therebetween. As a result, an increase in the manufacturing cost of this vibration-damping device can be suppressed.

Figure 2:
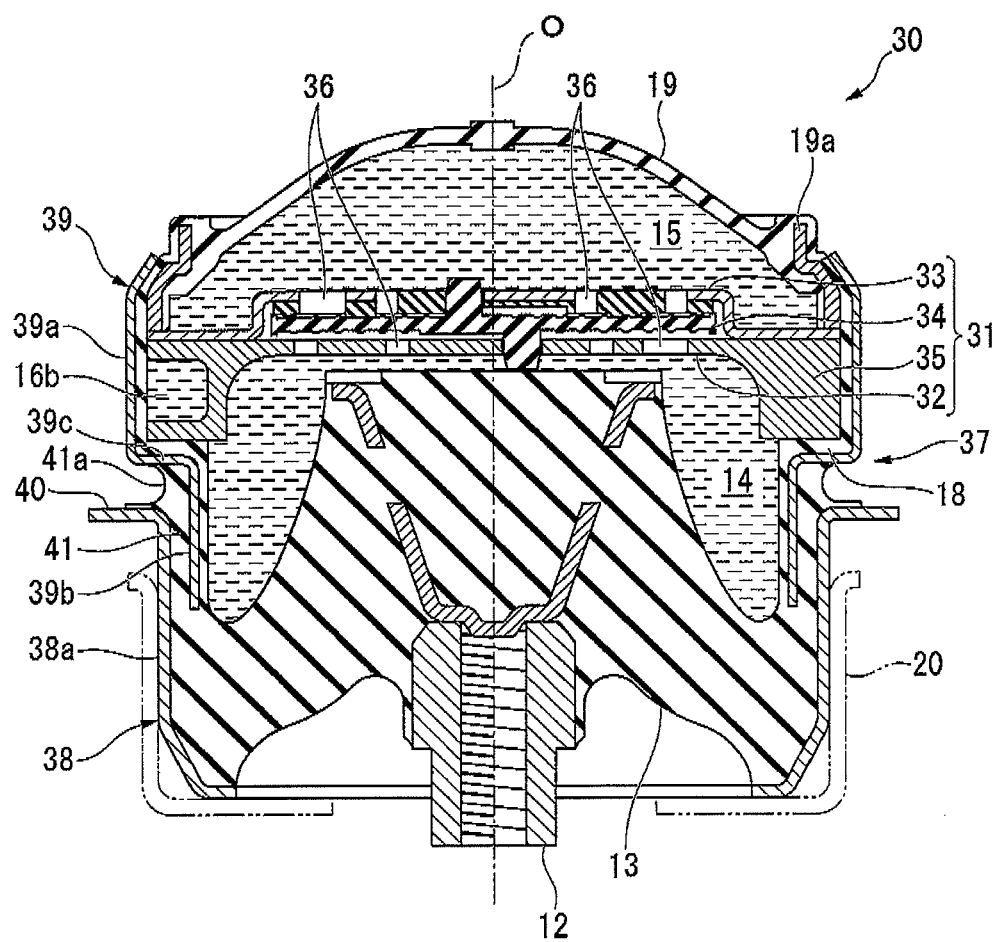
FIG. 2 is a longitudinal sectional view of a vibration-damping device shown as another embodiment related to the invention.

Additionally, the above embodiment has shown, as a vibration-damping device, a compression type vibration-damping device which is attached and used so that the main fluid chamber 14 is located on the upper side in the vertical direction and the auxiliary shown in FIG. 2, a hanging-type vibration-damping device 30 may be adopted which is attached and used so that the main fluid chamber 14 is located on the lower side in the vertical direction (at a first end in the direction of the axis O) and the auxiliary fluid chamber 15 is located on the upper side in the vertical direction (at a second end in the direction of the axis O).

Hereinafter, although the vibration-damping device 30 is described, the same parts as those of the vibration-damping device 10 shown in FIG. 1 are designated by the same reference numerals, the description thereof is omitted, and only different points will be described.

The partition member 31 shown in FIG. 2 includes a first partition plate 32 and a second partition plate 33 which are arranged at a distance from each other in the direction of the axis O, a movable plate 34 housed between the partition plates 32 and 33, and a main body 35 which has an outer circumferential surface fitted into the outer tube 37 and has the orifice passage 16b formed in the outer circumferential surface. The first partition plate 32 is arranged at the main fluid chamber 14, the second partition plate 33 is arranged at the auxiliary fluid chamber 15, and a plurality of through holes 36 is formed at positions which face the movable plate 34 in each of the partition plates 32 and 33.

In addition, the interval between the first and second partition plates 32 and 33 is made greater than the thickness of the movable plate 34, and the movable plate 34 is adapted to be able to move by about ±0.5 mm in the direction of the axis O between the first and second partition plates 32 and 33 by the fluctuation of liquid pressure within the plate 34 is formed in the shape of a disk from a rubber-like elastic material.

Here, similarly to the above embodiment, the outer tube 37 is split into a first outer tube member 38 at the first end and a second outer tube member 39 at the second end along the direction of the axis O. Additionally, the second end of the first outer tube member 38 in the direction of the axis O and the first end of the second outer tube member 39 in the direction of the axis O overlap each other in the radial direction of the outer tube 37 with a second rubber elastic body 41 therebetween.

Additionally, a push-in surface portion 40 is formed at the second end in the direction of the axis O in the first outer tube member 38 in which the attaching member 12 and the first rubber elastic body 13 are disposed. The push-in surface portion 40 extends toward the radial outside, and at least the radial outer end thereof is located radially outside the outer circumferential surface of the second outer tube member 39.

In the illustrated example, the push-in surface portion 40 is formed in the shape of a flange and the front and back surfaces of which are oriented in the direction of the axis O. In addition, the push-in surface portion 40 is formed at the second end of the first outer tube member 38 in the direction of the axis O. Additionally, the portion of the first outer tube member 38 connected to the push-in surface portion 40 from the first end in the direction of the axis O serves as a press-fit tubular portion 38a which extends along the direction of the axis O parallel thereto.

Additionally, the second outer tube member 39 has therein the diaphragm 19, a large-diameter portion 39a which has the partition member 16 and the orifice passage than the push-in surface portion 40 of the first outer tube member 38, a small-diameter portion 39b which is formed with a smaller diameter than the large-diameter portion 39a, and is located inside the press-fit tubular portion 38a in the first outer tube member 38, and a flange portion 39c which connects the large-diameter portions 39a and the small-diameter portions 39b together. The flange portion 39c is located closer to the second end in the direction of the axis O than the push-in surface portion 40 of the first outer tube member 38. Additionally, the external diameter of the press-fit tubular portion 38a in the first outer tube member 38 is made smaller than the internal diameter of the large-diameter portion 39a in the second outer tube member 39. Additionally, the push-in surface portion 40 in the first outer tube member 38 is located radially outside the outer circumferential surface of the large-diameter portion 39a in the second outer tube member 39.

Additionally, the inner circumferential surface of the press-fit tubular portion 38a in the first outer tube member 38 and the outer circumferential surface of the small-diameter portion 39b in the second outer tube member 39 face each other in the radial direction with the second rubber elastic body 41 therebetween. The second rubber elastic body 41 is disposed between the press-fit tubular portion 38a of the first outer tube member 38 and the small-diameter portion 39b of the second outer tube member 39, extends along the direction of the axis O, and reaches the flange portion 39c in the second outer tube member 39. Additionally, a gouged portion 41a which is recessed toward the radial inside is formed over the whole circumference at the portion of the second rubber elastic body 41 located closer to the second end in the direction of the axis O than the push-in surface portion 40 of the first outer tube member 38, the surface of the push-in surface portion 40 in the first outer tube member 38 is made thin, or the radial inner end in the surface of the push-in surface portion 40 is exposed.

Even in the vibration-damping device 30 shown in the FIG. 2 described above, similarly to the vibration-damping device 10 shown in FIG. 1, the generation of a noise or cavitation can be suppressed, it is possible to secure the durability of the second rubber elastic body 41, and the vibration-damping device 30 can be easily attached to the attaching bracket 20.

Moreover, in this embodiment, the gouged portion 41a is formed in the second rubber elastic body 41. Thus, when the push-in surface portion 40 is pushed into the attaching bracket 20 from the second end in the direction of the axis O in press-fitting the vibration-damping device 30 into the attaching bracket 20, it is possible to efficiently transmit the force to the press-fit tubular portion 38a without bending the push-in surface portion 40 toward the first end in the direction of the axis O, and the vibration-damping device 30 can be more easily attached to the attaching bracket 20.

The above respective embodiments have shown the configuration in which the attaching member 12 and the first rubber elastic body 13 are disposed at the first outer tube member 21 or 38, and the diaphragm 19, the partition members 16 and 31, and the orifice passage 16b are disposed at the second outer tube member 22 and 39. However, the configuration is not limited thereto. For example, the positions of members split in the direction of the axis O in the outer tubes 11 or 37 may be appropriately changed such that the attaching member 12, the first rubber elastic body 13, the partition members 16 and 31, and the orifice passage 16b are disposed at the first outer tube member 21 and 38, Additionally, the push-in surface portions 24 and 40 may not be provided.

Moreover, in the vibration-damping device 10 shown in FIG. 1, the projecting portion 26 is formed at the first end of the second outer tube member 22 in the direction of the axis O. Instead of this, however, for example, the projecting portion 26 may be formed at a middle position at the first end of the second outer tube member 22 in the direction of the axis O.

Additionally, in the vibration-damping device 30 shown in FIG. 2, the push-in surface portion 40 is formed at the second end of the first outer tube member 38 in the direction of the axis O. Instead of this, however, for example, the push-in surface portion may be formed at a middle position at the second end of the first outer tube member 38 in the direction of the axis O.

Moreover, the above embodiments have shown the configuration in which the second end of the first outer tube member 21 and 38 is located radially outside the first end of the second outer tube member 22 and 39. However, the second end of the first outer tube member 21 or 38 may be located radially inside the first end of the second outer tube member 22 or 39.

Additionally, in the vibration-damping device 10 shown by FIG. 1, the throttled portion 25 is formed at the first outer tube member 21 and the projecting portion 26 is formed at the second outer tube member 22. However, the throttled portion 25 and the projecting portion 26 need not be formed.

Additionally, the above embodiments have shown the configuration in which the 23 or 41 are integrally formed from the same rubber material. However, these members 13, 18, 23, and 41 may be independently separated from each other, or at least one of these members 13, 18, 23, and 41 may be formed from a different rubber material.

INDUSTRIAL APPLICABILITY

According to the invention, the generation of a noise from the vibration-damping device can be suppressed.

The invention claimed is:

1. A vibration-damping device comprising:
an outer tube connected to one of a vibration generating portion and a vibration receiving portion and having a first outer tube member and a second outer tube member, the first outer tube member and the second outer tube member being arranged separately without contact with each other;
an attaching member connected to the other of the vibration generating portion and the vibration receiving portion, and arranged at the inner circumferential side of the outer tube;
a first rubber elastic body which elastically connects the outer tube and the attaching member together, and closes an opening at a first end of the outer tube in the direction of an axis;
a diaphragm which closes an opening at a second end which is the other end of the outer tube in the direction of the axis; and
a partition member which partitions the inside of the outer tube into a main fluid chamber having the first rubber elastic body at a portion of a wall which forms the main fluid chamber, and an auxiliary fluid chamber having the diaphragm at a portion of the wall which forms the auxiliary fluid chamber,
wherein an orifice passage which communicates the main fluid chamber with the auxiliary fluid chamber is formed between the inner circumferential surface of the outer tube, and the outer circumferential surface of the partition member, and
a second end portion of the first outer tube member, at a second end in the direction of the axis of the first outer tube member, and a first end portion of the second outer tube member, at a first end in the direction of the axis of the second outer tube member, overlap each other in a radial direction of the outer tube,
a second rubber elastic body is provided such that it fills in a whole space between the second end portion of the first outer tube member and the first end portion of the second outer tube member, and
wherein a portion where the first end portion and the second end portion overlap via the second rubber elastic body is provided such that it surrounds a section of the main fluid chamber around the axis thereof,
wherein the attaching member and the first rubber elastic body are disposed at the first outer tube member; the diaphragm, the partition member, and the orifice passage are disposed at the second outer tube member, and the second rubber elastic body is located radially outside the main fluid chamber, and
wherein the second end of the first outer tube member is located radially outside the first end of the second outer tube member.

2. The vibration-damping device according to claim 1, wherein a push-in surface portion which extends toward the radial outside, which is at least a radial outer end and is located radially outside the outer circumferential surface of the second outer tube member, is formed at the second end of the first outer tube member.

3. The vibration-damping device according to claim 2, wherein a throttled portion is formed at the second end of the first outer tube member, and a portion connected to the throttled portion at the first end in the direction of the axis serves as the push-in surface portion, and a portion at the first end of the second outer tube member located closer to the first end in the direction of the axis than the throttled portion is formed with a projecting portion which is increased in diameter, and faces the push-in surface portion in the direction of the axis with the second rubber elastic body therebetween.

4. The vibration-damping device according to claim 3, wherein the external diameter at the second end of the second outer tube member is made less than or equal to the internal diameter of the throttled portion.

5. The vibration-damping device according to claim 1, wherein the inner circumferential surface of the outer tube is covered with a rubber membrane; the rubber membrane, the first rubber elastic body, and the second rubber elastic body are integrally formed from the same rubber material, and the thickness of the second rubber elastic body is made greater than the thickness of the rubber membrane.

* * * * *